United States Patent
Breuil et al.

(10) Patent No.: US 12,479,780 B2
(45) Date of Patent: Nov. 25, 2025

(54) OLIGOMERISATION PROCESS COMPRISING A STEP OF RECYCLING A PRE-COOLED SOLVENT

(71) Applicant: IFP ENERGIES NOUVELLES, Rueil-Malmaison (FR)

(72) Inventors: Pierre-Alain Breuil, Rueil-Malmaison (FR); Olivier Cotte, Rueil-Malmaison (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 71 days.

(21) Appl. No.: 18/284,606

(22) PCT Filed: Mar. 25, 2022

(86) PCT No.: PCT/EP2022/057937
§ 371 (c)(1),
(2) Date: Sep. 28, 2023

(87) PCT Pub. No.: WO2022/207495
PCT Pub. Date: Oct. 6, 2022

(65) Prior Publication Data
US 2025/0084014 A1    Mar. 13, 2025

(30) Foreign Application Priority Data

Mar. 30, 2021  (FR) ..................... 2103228

(51) Int. Cl.
C07C 2/08 (2006.01)
C07C 7/04 (2006.01)
C07C 11/08 (2006.01)

(52) U.S. Cl.
CPC .............. C07C 2/08 (2013.01); C07C 7/04 (2013.01); C07C 11/08 (2013.01)

(58) Field of Classification Search
CPC .... C07C 2/04; C07C 2/08; C07C 7/04; C07C 11/02; C07C 11/08; C07C 11/107; C10G 50/00
See application file for complete search history.

(56) References Cited

U.S. PATENT DOCUMENTS

| | | |
|---|---|---|
| 4,615,998 A | 10/1986 | Le Quan et al. |
| 6,444,866 B1 | 9/2002 | Commereuc et al. |
| 8,816,147 B2 | 8/2014 | Vinel et al. |
| 9,931,622 B2 | 4/2018 | Magna et al. |
| 10,150,108 B2 | 12/2018 | Magna et al. |
| 10,646,860 B2 | 5/2020 | Breuil et al. |
| 2013/0158321 A1 | 6/2013 | Olivier-Bourbigou et al. |

(Continued)

FOREIGN PATENT DOCUMENTS

GB      2326885 A    1/1999

OTHER PUBLICATIONS

International Search report PCT/EP2022/057937 dated Jul. 6, 2022 (pp. 1-2).

Primary Examiner — In Suk C Bullock
Assistant Examiner — Jason Y Chong
(74) Attorney, Agent, or Firm — Millen, White, Zelano & Branigan, P.C; Brion P. Heaney

(57) ABSTRACT

The present invention relates to a process for the oligomerization of an olefinic feedstock characterized in that a solvent fraction resulting from a downstream separation step is cooled and recycled.

23 Claims, 1 Drawing Sheet

(56) References Cited

U.S. PATENT DOCUMENTS

2015/0126790 A1* 5/2015 Venter .................. C07C 2/32
  585/511
2018/0318819 A1 11/2018 Breuil et al.
2020/0001266 A1 1/2020 Augier et al.

* cited by examiner

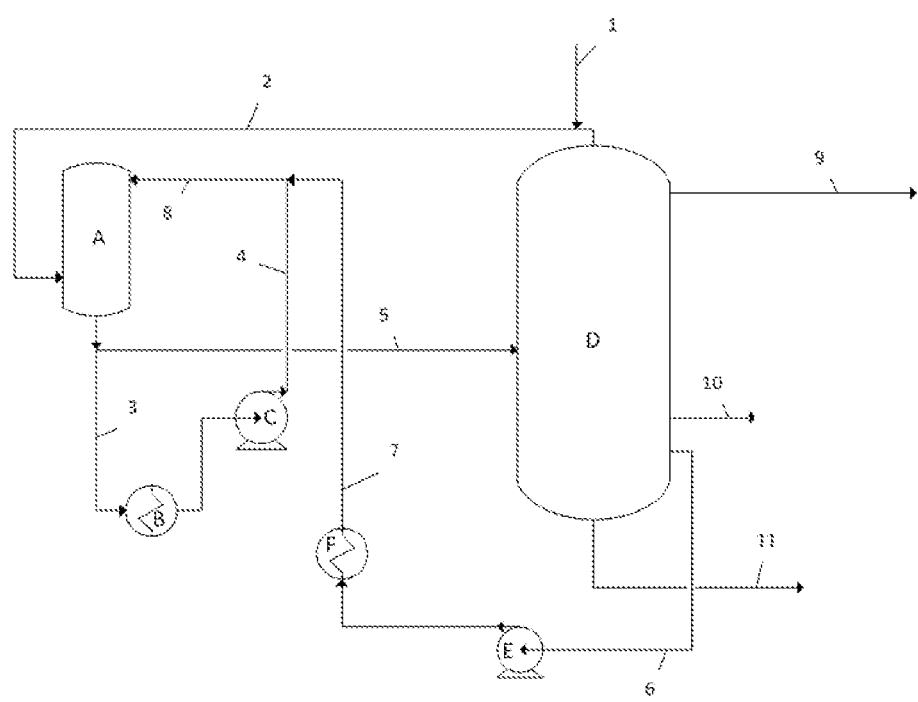

OLIGOMERISATION PROCESS COMPRISING A STEP OF RECYCLING A PRE-COOLED SOLVENT

TECHNICAL FIELD

The present invention relates to a process for the oligomerization of an olefinic feedstock characterized in that a solvent fraction resulting from a downstream separation step is cooled and recycled. In particular, the present invention relates to a process for the oligomerization of a gaseous olefinic feedstock, preferably of gaseous ethylene, to give linear α-olefins such as but-1-ene, hex-1-ene or oct-1-ene, or a mixture of linear α-olefins.

PRIOR ART

The invention relates to the field of oligomerization directed towards producing α-olefins which are used as comonomers in processes for producing polyethylene. The oligomerization reaction is commonly performed in a homogeneous catalysis process in the liquid phase in a two-phase gas/liquid reactor, in general with implementation in a bubble column, or in a single-phase liquid reactor.

The oligomerization reaction is highly exothermic; it is common to regulate the reaction temperature by use of external cooling. Generally, a reactor is coupled to one or more recirculation loops in order to withdraw a liquid fraction, cool it via an exchanger or exchangers, and reintroduce it into the reactor. Said recirculation loop makes it possible to obtain a good homogeneity of the concentrations and to control the temperature throughout the reaction volume. Patent EP 2 703 373 proposes a process for the trimerization of ethylene to give hex-1-ene that makes it possible to reduce the cost of the plants by limiting the energy consumption linked to the recirculation loop. For this, a bottom fraction composed mainly of solvent resulting from the separation section is used in the thermal exchanger of the recirculation loop and also for the reboiling of the bottom of a column of the separation section.

In the field of the invention, those skilled in the art are constantly seeking to control the sizing of the equipment which has an impact on the performance and cost of the process, and reduce the cost of the plants used for carrying out the oligomerization.

The applicant has discovered a process for the oligomerization of an olefinic feedstock characterized in that a solvent fraction resulting from a downstream separation step is cooled and recycled so as to partly control the exothermicity generated by the oligomerization reaction in the reactor. The process according to the invention makes it possible to limit the size of the heat exchanger(s) used in at least one recirculation loop by the implementation of the recycling of a cooled fraction of solvent resulting from a separation section. The aim of the present invention is to improve the process for the oligomerization of an olefinic feedstock, in particular ethylene, in a gas/liquid reactor or in an all-liquid reactor. The invention seeks notably to improve the productivity/profitability of the process, notably so as to avoid the phenomenon of breakthrough and/or to limit the investment and/or running costs of the process.

Subject of the Invention

The present invention relates to a process for the oligomerization of an olefinic feedstock carried out at a temperature between 30° C. and 200° C. and a pressure between 0.1 and 10 MPa, in the presence of a homogeneous catalytic oligomerization system and a solvent comprising a) a step of oligomerizing said olefinic feedstock in a reaction section comprising an oligomerization reactor and one or more recirculation loops enabling the control of the temperature in said reactor via the cooling of a liquid phase fraction, b) a step of separating, in a downstream separation section, a reaction effluent resulting from the oligomerization step a) so as to obtain a solvent fraction, c) a step of cooling the solvent fraction resulting from step b) to a temperature below the temperature of the recirculation loop(s), d) a step of introducing, into the oligomerization step a), the cooled solvent fraction resulting from step c) in the reaction section.

Preferably, the solvent fraction resulting from step b) is cooled to a temperature between 0° C. and 150° C.

Preferably, the solvent fraction resulting from step b) is cooled in step c) to a temperature at least 40° C. lower relative to the temperature of the cooled liquid fraction in the recirculation loop.

Preferably, the cooling of the solvent fraction in step c) is carried out by one or more thermal exchangers, preferably chosen from one or more heat exchangers of process fluid/process fluid type, of air cooler type, or of cooling water exchanger type.

Preferably, the downstream separation section comprises at least two distillation columns, preferably at least three distillation columns, preferably at least four distillation columns.

Preferably, step d) of introducing the cooled solvent fraction is carried out in the reactor and/or in one or more of the recirculation loops.

Preferably, step d) of introducing the cooled fraction is carried out in a recirculation loop upstream or downstream of a thermal exchanger of said recirculation loop, preferably downstream of said thermal exchanger.

Preferably, the cooled solvent fraction has a flow rate, as a weight percentage relative to the flow rate of the liquid circulating in the circulation loop(s), of between 0.05% and 15.0%, preferably between 0.1% and 10.0%.

Preferably, the olefinic feedstock comprises olefins having between 2 and 6 carbon atoms, preferably between 2 and 4 carbon atoms. Advantageously, the olefinic feedstock is chosen from butene, propylene and ethylene, alone or as a mixture.

Preferably, the oligomerization step a) comprises at least one of the following substeps:

substep a1) of introducing the catalytic system, substep a2) of bringing into contact with olefinic feedstock, substep a3) of withdrawing a liquid phase fraction from the oligomerization reactor, substep a4) of cooling at least one portion of the liquid fraction withdrawn in step a3), and substep a5) of introducing the cooled liquid fraction into the reactor.

Preferably, the cooling substep a4) is carried out by circulating at least one portion of the liquid fraction withdrawn in step a3) through one or more thermal exchangers located in the recirculation loop.

Advantageously, the thermal exchanger(s) used in substep a4) reduce(s) the temperature of the liquid fraction by 1.0° C. to 30.0° C., preferably between 2.0° C. and 25.0° C.

Preferably, the reaction effluent is obtained by dividing the liquid fraction withdrawn in step a3) into two streams.

Preferably, the oligomerization reactor is chosen from a two-phase gas/liquid reactor or a single-phase liquid reactor, preferably is a two-phase gas/liquid reactor, and very preferably of bubble column type.

Definition

In the context of the present invention, the term "fractionation section" denotes the device(s) for separation, notably by distillation, arranged downstream of the reaction section, with a single device or a plurality of devices arranged in series and/or in parallel, which devices may be identical or different in their sizing or their design/operation.

In the context of the present text, the terms "upstream" and "downstream" are understood as a function of the general direction of flow of the reaction fluid in the production unit.

In the context of the present text, the expressions heat exchanger and thermal exchanger are used in an equivalent manner.

A homogeneous catalyst or catalytic system is understood to mean the fact that the catalyst or catalytic system is in the same phase as the reactants and the products of the oligomerization reaction.

Breakthrough is understood to mean the passage of gaseous ethylene from the liquid phase to the gas phase in a gas/liquid reactor.

The content of solvent is understood to mean the weight ratio of the total flow rate of solvent injected to the sum of the total flow rate of gaseous ethylene injected and the flow rate of solvent injected into the reactor.

A two-phase gas/liquid reactor is understood to mean a reactor comprising a liquid phase in a lower zone and a gas phase in an upper zone when it is used in an oligomerization process.

Within the context the present invention, the term "reaction section" denotes the reactor and the recirculation loop(s).

A liquid phase is understood to mean the mixture of all the compounds which are in a liquid physical state under the temperature and pressure conditions of the reactor.

The lower zone of the reactor is understood to mean the part of the reactor comprising the liquid phase, the gaseous olefinic feedstock, in particular gaseous ethylene, the reaction products such as the desired linear α-olefin (i.e but-1-ene, hex-1-ene, oct-1-ene or the mixture of linear α-olefins), the catalytic system and a solvent.

The upper zone of the reactor is understood to mean the part of the reactor that is located at the apex of the chamber, i.e. directly above the lower zone and consisting of the gas phase corresponding to the gas headspace.

The lower part of the reactor is understood to mean the lower quarter of said reactor containing the liquid phase.

The upper part of the reactor is understood to mean the upper quarter of said reactor containing the liquid phase.

The volume of reaction liquid is understood to mean the amount of liquid in which the oligomerization reaction takes place, which amount is contained in the reactor and/or the recirculation loop(s).

The volume of a recirculation loop or loops denotes the size of said loop(s) corresponding to the volume of reaction liquid that may be contained by said loop(s).

Process

The present invention relates to a process for the oligomerization of an olefinic feedstock in which a solvent fraction resulting from a downstream separation step is cooled and recycled to the reaction section so as to partly control the exothermicity of the oligomerization step.

In particular, the present invention relates to a process for the oligomerization of an olefinic feedstock carried out at a temperature between 30° C. and 200° C. and a pressure between 0.1 and 10 MPa, in the presence of a homogeneous catalytic oligomerization system and a solvent comprising a) a step of oligomerization in a reaction section comprising an oligomerization reactor and at least one recirculation loop enabling the control of the temperature in said reactor via the cooling of a liquid phase fraction, b) a step of separation in a downstream section for separating an effluent resulting from the oligomerization step a) so as to obtain a solvent fraction, c) a step of cooling the solvent fraction resulting from step b) to a temperature below the temperature of the recirculation loop, and d) a step of introducing, into the oligomerization step a), the cooled solvent fraction resulting from step c).

The invention makes it possible to reduce the heat exchange in the recirculation loop while minimizing the temperature of the solvent introduced into the reactor via the recirculation loop. The control of the temperature by the cooled solvent fraction resulting from the downstream separation makes it possible to reduce the amount of heat to be exchanged in the recirculation loops and therefore the size of the exchangers. The expected saving may advantageously be of the order of 1% to 50%, preferably between 2% and 40% and preferentially between 3% and 30% over the exchange surface area.

Furthermore, the oligomerization reaction takes place both in the reaction liquid contained in the reactor and in the recirculation loop(s). The reduction of the size of the heat exchangers means that the volume of at least one recirculation loop decreases.

When the process according to the invention is carried out with a total volume of reaction liquid (reactor+recirculation loop) which is identical compared to a process not implementing the invention, then the volume of reaction liquid in the reactor increases, which makes it possible to improve the saturation of the liquid reaction medium with olefinic feedstock and therefore the performance of the process.

When the process according to the invention is carried out with an amount of reaction liquid in the reactor that is identical compared to a process not implementing the invention, then the proportion of volume of reaction liquid in a recirculation loop decreases relative to the total volume of reaction liquid. This decrease makes it possible to reduce the residence time and therefore to improve the performance of the catalytic system in terms of activity and selectivity.

Thus, the present invention makes it possible to easily adjust the productivity and profitability of the oligomerization process as a function of the performance of the catalytic system used.

Homogeneous Catalytic Oligomerization System

All the catalytic systems known to those skilled in the art and capable of being employed in dimerization, trimerization or tetramerization processes and more generally in the oligomerization processes according to the invention come within the field of the invention.

Said catalytic systems and their implementation are notably described in patent applications FR 2 984 311, FR 2 552 079, FR 3 019 064, FR 3 023 183, FR 3 042 989 or also in patent application FR 3 045 414.

Preferably, the catalytic systems comprise, and preferably consist of:
- a metal precursor, preferably based on nickel, titanium or chromium,
- optionally an activating agent,
- optionally an additive, and
- optionally a solvent.

The Metal Precursor

The metal precursor used in the catalytic system is chosen from compounds based on nickel, titanium or chromium.

In one embodiment, the metal precursor is based on nickel and preferentially comprises nickel in (+II) oxidation state. Preferably, the nickel precursor is chosen from nickel(II) carboxylates, for instance nickel 2-ethylhexanoate, nickel (II) phenates, nickel(II) naphthenates, nickel(II) acetate, nickel(II) trifluoroacetate, nickel(II) triflate, nickel(II) acetylacetonate, nickel(II) hexafluoroacetylacetonate, π-allylnickel(II) chloride, π-allylnickel(II) bromide, methallylnickel(II) chloride dimer, $\eta^3$-allylnickel(II) hexafluorophosphate, $\eta^3$-methallylnickel(II) hexafluorophosphate and nickel(II) 1,5-cyclooctadienyl, in their hydrated or non-hydrated form, taken alone or as a mixture.

In a second embodiment, the metal precursor is based on titanium and preferentially comprises a titanium aryloxy or alkoxy compound.

The titanium alkoxy compound advantageously corresponds to the general formula [Ti(OR)$_4$] in which R is a linear or branched alkyl radical. Among the preferred alkoxy radicals, nonlimiting examples that may be mentioned include tetraethoxy, tetraisopropoxy, tetra(n-butoxy) and tetra(2-ethylhexyloxy).

The titanium aryloxy compound advantageously corresponds to the general formula [Ti(OR')$_4$] in which R' is an aryl radical which is unsubstituted or substituted with alkyl or aryl groups. The radical R' may include heteroatom-based substituents. The preferred aryloxy radicals are chosen from phenoxy, 2-methylphenoxy, 2,6-dimethylphenoxy, 2,4,6-trimethylphenoxy, 4-methylphenoxy, 2-phenylphenoxy, 2,6-diphenylphenoxy, 2,4,6-triphenylphenoxy, 4-phenylphenoxy, 2-(tert-butyl)-6-phenylphenoxy, 2,4-di(tert-butyl)-6-phenylphenoxy, 2,6-diisopropylphenoxy, 2,6-di(tert-butyl)phenoxy, 4-methyl-2,6-di(tert-butyl)phenoxy, 2,6-dichloro-4-(tert-butyl)phenoxy and 2,6-dibromo-4-(tert-butyl)phenoxy, the biphenoxy radical, binaphthoxy and 1,8-naphthalenedioxy.

According to a third embodiment, the metal precursor is based on chromium and preferentially comprises a chromium(II) salt, a chromium(III) salt or a salt of different oxidation state which may include one or more identical or different anions, for instance halides, carboxylates, acetylacetonates or alkoxy or aryloxy anions. Preferably, the chromium-based precursor is chosen from CrCl$_3$, CrCl$_3$(tetrahydrofuran)$_3$, Cr(acetylacetonate)$_3$, Cr(naphthenate)$_3$, Cr(2-ethylhexanoate)$_3$ and Cr(acetate)$_3$.

The concentration of nickel, titanium or chromium is between 0.001 and 300.0 ppm by mass of atomic metal, relative to the reaction mass, preferably between 0.002 and 100.0 ppm, preferentially between 0.003 and 50.0 ppm, more preferentially between 0.05 and 20.0 ppm and even more preferentially between 0.1 and 10.0 ppm by mass of atomic metal, relative to the reaction mass.

The Activating Agent

Optionally, irrespective of the metal precursor, the catalytic system comprises one or more activating agents chosen from aluminum-based compounds, such as methylaluminum dichloride (MeAlCl$_2$), dichloroethylaluminum (EtAlCl$_2$), ethylaluminum sesquichloride (Et$_3$Al$_2$Cl$_3$), chlorodiethylaluminum (Et$_2$AlCl), chlorodiisobutylaluminum (i-Bu$_2$AlCl), triethylaluminum (AlEt$_3$), tripropylaluminum (Al(n-Pr)$_3$), triisobutylaluminum (Al(i-Bu)$_3$), diethylethoxyaluminum (Et$_2$AlOEt), methylaluminoxane (MAO), ethylaluminoxane and modified methylaluminoxanes (MMAO).

The Additive

Optionally, the catalytic system comprises one or more additives.

The additive is chosen from monodentate phosphorus-based compounds, bidentate phosphorus-based compounds, tridentate phosphorus-based compounds, olefinic compounds, aromatic compounds, nitrogenous compounds, bipyridines, diimines, monodentate ethers, bidentate ethers, monodentate thioethers, bidentate thioethers, monodentate or bidentate carbenes, mixed ligands such as phosphinopyridines, iminopyridines, or bis(imino)pyridines.

When the catalytic system is based on nickel, the additive is chosen from:
- compounds of nitrogenous type, such as trimethylamine, triethylamine, pyrrole, 2,5-dimethylpyrrole, pyridine, 2-methylpyridine, 3-methylpyridine, 4-methylpyridine, 2-methoxypyridine, 3-methoxypyridine, 4-methoxypyridine, 2-fluoropyridine, 3-fluoropyridine, 3-trifluoromethylpyridine, 2-phenylpyridine, 3-phenylpyridine, 2-benzylpyridine, 3,5-dimethylpyridine, 2,6-di(tert-butyl)pyridine and 2,6-diphenylpyridine, quinoline, 1,10-phenanthroline, N-methylpyrrole, N-butylpyrrole, N-methylimidazole, N-butylimidazole, 2,2'-bipyridine, N,N'-dimethylethane-1,2-diimine, N,N'-di(t-butyl)ethane-1,2-diimine, N,N'-di(t-butyl)butane-2,3-diimine, N,N'-diphenylethane-1,2-diimine, N,N'-bis(2,6-dimethylphenyl)ethane-1,2-diimine, N,N'-bis(2,6-diisopropylphenyl)ethane-1,2-diimine, N,N'-diphenylbutane-2,3-diimine, N,N'-bis(2,6-dimethylphenyl)butane-2,3-diimine or N,N'-bis(2,6-diisopropylphenyl)butane-2,3-diimine, or
- compounds of phosphine type independently chosen from tributylphosphine, triisopropylphosphine, tricyclopentylphosphine, tricyclohexylphosphine, triphenylphosphine, tris(o-tolyl)phosphine, bis(diphenylphosphino)ethane, trioctylphosphine oxide, triphenylphosphine oxide or triphenyl phosphite, or
- compounds corresponding to the general formula (1) or one of the tautomers of said compound:

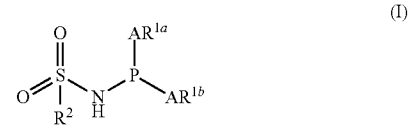

(I)

in which:
- A and A', which may be identical or different, are independently an oxygen or a single bond between the phosphorus atom and a carbon atom,
- the groups $R^{1a}$ and $R^{1b}$ are independently chosen from methyl, trifluoromethyl, ethyl, n-propyl, isopropyl, n-butyl, isobutyl, t-butyl, pentyl, cyclohexyl and adamantyl groups, which may or may not be substituted and may or may not contain heteroelements; phenyl, o-tolyl, m-tolyl, p-tolyl, mesityl, 3,5-dimethylphenyl, 4-(n-butyl)phenyl, 2-methylphenyl, 4-methoxyphenyl, 2-methoxyphenyl, 3-methoxyphenyl, 4-methoxyphenyl, 2-isopropoxyphenyl, 4-methoxy-3,5-dimethylphenyl, 3,5-bis(tert-butyl)-4-methoxyphenyl, 4-chlorophenyl, 3,5-bis(trifluoromethyl)phenyl, benzyl, naphthyl, bisnaphthyl, pyridyl, bisphenyl, furanyl and thiophenyl groups, the group $R^2$ is independently chosen from methyl, trifluoromethyl, ethyl, n-propyl, isopropyl, n-butyl, isobutyl, t-butyl, pentyl, cyclohexyl and adamantyl groups, which may or may not be substituted and may or may not contain heteroelements; phenyl, o-tolyl, m-tolyl, p-tolyl, mesityl, 3,5-dimethylphenyl, 4-(n-butyl)phenyl, 4-methoxyphenyl, 2-methoxyphenyl, 3-methoxyphenyl, 4-methoxyphenyl, 2-isopropoxyphenyl, 4-methoxy-3,5-dimethylphenyl, 3,5-di(tert-butyl)-4-methoxyphenyl, 4-chlorophenyl, 3,5-bis(trifluoromethyl)phenyl, benzyl, naphthyl, bisnaphthyl, pyridyl, bisphenyl, furanyl and thiophenyl groups.

When the catalytic system is based on titanium, the additive is chosen from diethyl ether, diisopropyl ether, dibutyl ether, diphenyl ether, 2-methoxy-2-methylpropane, 2-methoxy-2-methylbutane, 2,2-dimethoxypropane, 2,2-bis(2-ethylhexyloxy)propane, 2,5-dihydrofuran, tetrahydrofuran, 2-methoxytetrahydrofuran, 2-methyltetrahydrofuran, 3-methyltetrahydrofuran, 2,3-dihydropyran, tetrahydropyran, 1,3-dioxolane, 1,3-dioxane, 1,4-dioxane, dimethoxyethane, bis(2-methoxyethyl) ether, benzofuran, glyme and diglyme, taken alone or as a mixture.

When the catalytic system is based on chromium, the additive is chosen from:

compounds of nitrogenous type, such as trimethylamine, triethylamine, pyrrole, 2,5-dimethylpyrrole, pyridine, 2-methylpyridine, 3-methylpyridine, 4-methylpyridine, 2-methoxypyridine, 3-methoxypyridine, 4-methoxypyridine, 2-fluoropyridine, 3-fluoropyridine, 3-trifluoromethylpyridine, 2-phenylpyridine, 3-phenylpyridine, 2-benzylpyridine, 3,5-dimethylpyridine, 2,6-di(tert-butyl)pyridine and 2,6-diphenylpyridine, quinoline, 1,10-phenanthroline, N-methylpyrrole, N-butylpyrrole, N-methylimidazole, N-butylimidazole, 2,2'-bipyridine, N,N'-dimethylethane-1,2-diimine, N,N'-di(t-butyl)ethane-1,2-diimine, N,N'-di(t-butyl)butane-2,3-diimine, N,N'-diphenylethane-1,2-diimine, N,N'-bis(2,6-dimethylphenyl)ethane-1,2-diimine, N,N'-bis(2,6-diisopropylphenyl)ethane-1,2-diimine, N,N'-diphenylbutane-2,3-diimine, N,N'-bis(2,6-dimethylphenyl)butane-2,3-diimine or N,N'-bis(2,6-diisopropylphenyl)butane-2,3-diimine, or aryloxy compounds of general formula $[M(R^3O)_{2-n}X_n]_y$, in which:

M is chosen from magnesium, calcium, strontium and barium, preferably magnesium, $R^3$ is an aryl radical containing from 6 to 30 carbon atoms and X is a halogen or an alkyl radical containing from 1 to 20 carbon atoms, n is an integer which can take the values of 0 or 1, and y is an integer between 1 and 10; preferably, y is equal to 1, 2, 3 or 4.

Preferably, the aryloxy radical $R^3O$ is chosen from 4-phenylphenoxy, 2-phenylphenoxy, 2,6-diphenylphenoxy, 2,4,6-triphenylphenoxy, 2,3,5,6-tetraphenylphenoxy, 2-(tert-butyl)-6-phenylphenoxy, 2,4-di(tert-butyl)-6-phenylphenoxy, 2,6-diisopropylphenoxy, 2,6-dimethylphenoxy, 2,6-di(tert-butyl)phenoxy, 4-methyl-2,6-di(tert-butyl)phenoxy, 2,6-dichloro-4-(tert-butyl)phenoxy and 2,6-dibromo-4-(tert-butyl)phenoxy. The two aryloxy radicals may be borne by the same molecule, for instance the biphenoxy radical, binaphthoxy or 1,8-naphthalenedioxy. Preferably, the aryloxy radical $R^3O$ is 2,6-diphenylphenoxy, 2-(tert-butyl)-6-phenylphenoxy or 2,4-di(tert-butyl)-6-phenylphenoxy.

Oligomerization Step a)

The process according to the invention therefore comprises a step a) of oligomerization of the olefinic feedstock carried out at a temperature between 30° C. and 200° C. and a pressure between 0.1 and 10 MPa, in the presence of a homogeneous catalytic oligomerization system and a solvent. Said oligomerization step a) is carried out in a reaction section comprising an oligomerization reactor and at least one recirculation loop enabling the control of the temperature in said reactor via the cooling of a liquid phase fraction. The cooling of the liquid fraction consists in cooling said fraction to a temperature below that of the oligomerization temperature so as to control the exothermicity of the reaction.

Preferably, the oligomerization reactor is chosen from a two-phase gas/liquid reactor or a single-phase liquid reactor, preferably is a two-phase gas/liquid reactor, and very preferably is a reactor of bubble column type.

The olefinic feedstock preferably comprises olefins having between 2 and 6 carbon atoms, preferably between 2 and 4 carbon atoms. Preferably, the olefinic feedstock is chosen from butene, more particularly isobutene or but-1-ene, propylene and ethylene, alone or as a mixture.

In the remainder of the present text, unless otherwise indicated, when ethylene is mentioned specifically, this also denotes olefins having between 2 and 6 carbon atoms, therefore isobutene or but-1-ene, propylene, and ethylene.

Preferably, the oligomerization process is a process for dimerization, trimerization or tetramerization, preferably of ethylene.

Advantageously, the oligomerization process is performed at a pressure of between 0.1 and 10.0 MPa, preferably between 0.2 and 9.0 MPa and preferentially between 0.3 and 8.0 MPa, at a temperature of between 30° C. and 200° C., preferably between 35° C. and 180° C., preferably between 45° C. and 170° C., preferentially between 60° C. and 160° C., preferably between 70° C. and 150° C., preferably between 80° C. and 145° C. and preferably between 100° C. and 140° C.

The reaction effluent resulting from step a) sent to the separation section downstream of the reaction section is obtained by withdrawing a liquid fraction from the reactor.

In one particular embodiment, the reaction effluent is obtained by dividing the liquid fraction withdrawn in step a3) defined below into two streams. The first stream is sent to the cooling step a4), and the second stream corresponds to the effluent and is sent to the downstream separation section.

Advantageously, the flow rate of the reaction effluent is regulated in order to maintain a constant liquid level in the reactor. Preferably, the flow rate of said effluent is from 5 to 200 times lower than the liquid flow rate sent to the cooling step a4). Preferably, the flow rate of said effluent is from 5 to 150 times lower, preferably from 10 to 120 times lower and preferably from 20 to 100 times lower.

Since the oligomerization reaction takes place both in the reactor and in the recirculation loop(s), the residence time in the reaction section is therefore understood over the whole of the volume of the reactor and of the recirculation loop(s) forming the reaction section.

Advantageously, the oligomerization process is performed with a solvent content of between 0 and 90 wt %, preferably between 10 and 85 wt %, preferably between 20 and 80 wt %, and preferably between 30 and 75 wt %. Advantageously, the oligomerization process is performed in a two-phase gas/liquid reactor of bubble column type for example with a gaseous ethylene feedstock. The dissolving of the ethylene bubbles in the reaction medium takes place in the bubble column. The higher the height of liquid available in this column, the closer the dissolution of ethylene is to complete saturation. Since the selectivity of the reaction toward the main reaction product is inversely related to the conversion of ethylene in the liquid, maximising the amount of dissolved ethylene will make it possible, at constant ethylene flow rate at the inlet of the reactor, to reduce the conversion and therefore to increase the selectivity.

Since the recirculation loops represent a significant proportion of the volume of reaction liquid of the reaction section, it is advantageous to reduce this volume as much as possible in order
- either to increase the volume of reaction liquid in the reactor (for example in a bubble column) and consequently the liquid height in the reactor, in particular in the bubble column and thus to maximize the saturation of ethylene in the liquid,
- or to decrease the volume of the recirculation loop(s) while maintaining a constant volume of the reactor and thus to reduce the residence time, which may make it possible to improve the performance of the catalytic system in terms of activity and selectivity.

The solvent(s) are advantageously chosen from ethers, alcohols, halogenated solvents and hydrocarbons, which may be saturated or unsaturated, cyclic or non-cyclic, aromatic or non-aromatic, comprising between 1 and 20 carbon atoms, preferably between 4 and 15 carbon atoms, preferentially between 4 and 12 carbon atoms and even more preferentially between 4 and 8 carbon atoms.

Preferably, the solvent is chosen from pentane, hexane, cyclohexane, methylcyclohexane, heptane, butane or isobutane, cycloocta-1,5-diene, benzene, toluene, ortho-xylene, mesitylene, ethylbenzene, diethyl ether, tetrahydrofuran, 1,4-dioxane, dichloromethane, dichloroethane, tetrachloroethane, hexachloroethane, chlorobenzene, dichlorobenzene, butene, hexene and octene, pure or as a mixture.

Preferably, the solvent may be advantageously chosen from the products of the oligomerization reaction. Preferably, the solvent used is cyclohexane.

In order to discharge the energy of the reaction, one or more recirculation loops are used. The recirculation loop makes it possible to circulate, from the bottom of the reactor, a liquid phase fraction comprising the products of the reaction, the solvent and the catalytic system, through an exchanger before being sent to the top of the reactor.

Preferably, the linear α-olefins obtained comprise from 4 to 20 carbon atoms, preferably from 4 to 18 carbon atoms, preferably from 4 to 10 carbon atoms and preferably from 4 to 8 carbon atoms. Preferably, the olefins are linear α-olefins chosen from but-1-ene, hex-1-ene and oct-1-ene.

Advantageously, the reaction section comprises one or more reactors of gas/liquid or all-liquid type, arranged in series and/or in parallel, and also their associated equipment, such as:

- a recirculation loop or loops comprising one or more thermal exchangers and associated with (each of) the reactor(s) to control the exothermicity of the reaction,
- means for introducing the catalytic oligomerization system into the reaction section(s),
- means external to the reaction section for separating/neutralizing the catalytic system.

Advantageously, the oligomerization step a) comprises at least one of the following substeps:
- substep a1) of introducing the catalytic system,
- substep a2) of bringing into contact with olefinic feedstock,
- substep a3) of withdrawing a liquid phase fraction,
- substep a4) of cooling the liquid fraction,
- substep a5) of introducing the cooled liquid fraction into the reactor.

Preferably, the oligomerization step a) comprises the substeps a1), a2), a3), a4) and a5).

Substep a1) of Introducing the Catalytic System

Advantageously, the oligomerization step a) comprises a substep a1) of introducing a catalytic system comprising a metal precursor and an activating agent, optionally an additive and optionally a solvent or mixture of solvents, preferably into a two-phase gas/liquid reactor or a single-phase liquid reactor.

When the oligomerization process uses a two-phase gas/liquid reactor, said reactor comprises a liquid phase in a lower zone and a gas phase in an upper zone.

Preferably, the catalytic system is introduced as a mixture with the liquid fraction introduced in step a5).

Preferably, the pressure for introduction into the reactor is between 0.1 and 10.0 MPa, preferably between 0.2 and 9.0 MPa and preferentially between 0.3 and 8.0 MPa.

Substep a2) of Bringing into Contact with the Olefinic Feedstock

Advantageously, the oligomerization step a) comprises a substep a2) of introducing the olefinic feedstock, preferably gaseous ethylene. Preferably, said olefinic feedstock is introduced into the liquid phase in the lower part of the reactor. The olefinic feedstock may comprise fresh feedstock, and preferably, as a mixture with olefinic feedstock recycled from a downstream separation step to the oligomerization process.

Preferably, when the olefinic feedstock introduced is gaseous, said feedstock is distributed by dispersion during its introduction into the lower liquid phase of the reactor by a means capable of carrying out said dispersion uniformly over the entire section of the reactor. Preferably, the dispersion means is chosen from a distributor network with a homogeneous distribution of the ethylene injection points over the entire section of the reactor.

Preferably, the olefinic feedstock is introduced at a flow rate between 1 and 250 t/h, preferably between 2 and 200 t/h, preferably between 5 and 100 t/h.

Preferably, the flow rate of olefinic feedstock introduced in step a2) is controlled by the pressure in the reactor.

According to a specific implementation of the invention, a stream of gaseous hydrogen can also be introduced into the reactor, with a flow rate representing from 0.01% to 1.0% by weight of the flow rate of incoming olefinic feedstock. Preferably, the stream of gaseous hydrogen is introduced by the pipe employed for the introduction of the olefinic feedstock.

Substep a3) of Withdrawing a Liquid Phase Fraction

Advantageously, the oligomerization step a) comprises a substep a3) of withdrawing a liquid phase fraction from the oligomerization reactor, preferably in the lower part of said reactor.

The withdrawal implemented in step a3) is preferably carried out below the level of injection of the olefinic feedstock, and preferably in the bottom of the chamber. The withdrawal is carried out by any means capable of carrying out the withdrawal and preferably by means of a pipe combined with a pump.

Preferably, the withdrawal flow rate is between 10 and 10 000 t/h and preferably between 100 and 7000 t/h.

Substep a4) of Cooling the Liquid Fraction

Advantageously, the oligomerization step a) comprises a substep a4) of cooling at least one portion of the liquid fraction withdrawn in step a3). Preferably, the cooling step is carried out by circulating at least one portion of the liquid fraction withdrawn in step a3) through one or more thermal exchangers located in the recirculation loop.

Advantageously, the heat exchanger(s) used in substep a4) make it possible to reduce the temperature of the liquid fraction by 1.0° C. to 30.0° C., preferably between 2.0° C. and 25° C., preferably between 3.0° C. and 20.0° C. and preferably between 5.0° C. and 15.0° C.

Advantageously, the cooling of the liquid fraction makes it possible to maintain the temperature of the reaction medium within the desired temperature ranges for carrying out the oligomerization reaction within the reactor.

Advantageously, the implementation of the step of cooling the liquid via the recirculation loop also makes it possible to carry out the stirring of the reaction medium and thus to homogenize the concentrations of the reactive entities throughout the liquid volume of the reactor.

Substep a5) of Introducing the Cooled Liquid Fraction

Advantageously, the oligomerization step a) comprises a substep a5) of introducing the liquid fraction cooled in step a4).

The introduction of the cooled liquid fraction resulting from step a4) is preferably carried out in the liquid phase of the reactor, preferably in the upper part of said reactor, by any means known to a person skilled in the art, such as a pipe.

Preferably, the flow rate for introduction of the cooled liquid fraction is between 10 and 10 000 t/h and preferably between 100 and 7000 t/h.

Substeps a3) to a5) constitute a recirculation loop. Advantageously, the recirculation loop also makes it possible to ensure the stirring of the reaction medium, and thus to homogenize the concentrations of the reactive entities throughout the liquid volume of the reactor.

Downstream Separation Step b)

The process according to the invention therefore comprises a step b) of downstream separation of an effluent resulting from the oligomerization step a) in a downstream section so as to obtain, inter alia, a solvent fraction.

Said solvent fraction is mainly composed of solvent. Advantageously, the solvent content of said fraction is greater than or equal to 95 wt %, preferably greater than 98 wt % and preferably greater than or equal to 99 wt %.

Typically, the downstream separation step may be carried out with separation means, such as distillation columns, operating in series and based on the differences in boiling points of the compounds to be separated. The compounds to be separated comprise the product(s) of the oligomerization reaction such as the linear α-olefins obtained, optionally the olefinic feedstock that has not reacted, and the solvent(s).

Preferably, the downstream separation step also includes a preliminary step of neutralizing the catalyst. The catalyst may be removed from the products of the reaction in a dedicated manner or as a mixture with the heaviest compounds.

Preferably, the downstream separation section comprises at least two distillation columns, preferably at least three distillation columns, and preferably at least four distillation columns. Said columns are positioned in parallel and/or in series, preferably in series. According to a preferred variant, the distillation section comprises three distillation columns. The separation of the solvent fraction can be carried out in any one of the distillation columns of the downstream separation section as long as said solvent fraction is mainly composed of solvent in order to be able to recycle said fraction to the oligomerization reactor.

Advantageously, the separation step b) uses a first distillation column at a pressure between 0.1 and 3.0 MPa, preferably between 0.5 and 1 MPa, a column top temperature between 0° C. and 100° C., preferably between 40° C. and 80° C., and a column bottom temperature between 100° C. and 300° C., preferably between 140° C. and 220° C. Said first distillation column makes it possible to separate the unconverted olefinic feedstock, in particular unconverted ethylene, in a top fraction from the rest of the compounds in the bottom fraction.

Advantageously, the separation step b) uses a second distillation column at a pressure between 0 and 2.0 MPa, preferably between 0.01 and 1.0 MPa, a column top temperature between 20° C. and 150° C., preferably between 40° C. and 130° C., and a column bottom temperature between 50° C. and 300° C., preferably between 80° C. and 250° C. Preferably, said second column makes it possible to separate said bottom fraction resulting from the first column into a top fraction (31) comprising the linear α-olefins obtained, in particular hex-1-ene, the solvent and a bottom fraction comprising the heaviest compounds.

Advantageously, the separation step b) uses a third distillation column at a pressure between 0 and 1.0 MPa, preferably between 0.01 and 0.5 MPa, a column top temperature between 30° C. and 130° C., preferably between 50° C. and 90° C., and a column bottom temperature between 50° C. and 200° C., preferably between 90° C. and 180° C. Preferably, said third column makes it possible to separate the hex-1-ene at the top from the solvent at the bottom.

By way of nonlimiting example, in the case of the trimerization of ethylene to hex-1-ene, the effluent resulting from the ethylene trimerization step a) comprising ethylene, the solvent, the catalytic system for trimerization of the ethylene and the products formed including hex-1-ene, can be separated in a separation step b) comprising at least the following substeps:

b1) a first step of separating, in a first distillation column, the effluent from the ethylene trimerization reaction, into a top fraction comprising ethylene and a bottom fraction, b2) a second step of separating, in at least one other distillation column, at least one portion of the bottom fraction resulting from step b1) into a top fraction comprising hex-1-ene and the solvent and a bottom fraction comprising C8+ hydrocarbons, and b3) a third step of separating, in a final distillation column, at least one portion of the fraction comprising hex-1-ene and the solvent resulting from step b2) into a top fraction comprising mainly hex-1-ene and into a bottom fraction comprising mainly the solvent.

In accordance with the invention, at least one solvent fraction originating from the bottom fraction resulting from step b3) is cooled in step c) then sent back into the reaction section in step d).

Cooling Step c)

The process according to the invention comprises a step c) of cooling the solvent fraction resulting from the downstream separation step b) to a temperature below the temperature of the recirculation loop.

The cooling of the solvent fraction to a temperature below the temperature of the recirculation loop, preferably from the temperature obtained at the end of step a4), makes it possible to reduce the heat exchange needed in the recirculation loop(s) in order to attain the temperature of the cooled liquid fraction resulting from said loop which is introduced into the reactor, and therefore to reduce the size of the exchanger(s).

The cooling of the solvent fraction in step c) may be carried out by one or more thermal exchangers that exchange either with a process fluid, or with air, or with cooling water or any other type of cold fluid that makes it possible to attain the desired temperature or using a combination of these exchangers. Advantageously, the exchanger is chosen from one or more heat exchangers of process fluid/process fluid type (of TEMA type or other types known to those skilled in the art), of air cooler type, of cooling water exchanger type or exchanger with any other type of cold fluid that makes it possible to attain the desired temperature.

Advantageously, the solvent fraction resulting from step b) is cooled to a temperature between 0° C. and 150° C., preferably between 5° C. and 100° C., preferably between 10° C. and 90° C., preferably between 20° C. and 80° C., preferably between 25° C. and 70° C., and preferably between 30° C. and 60° C.

Advantageously, the solvent fraction resulting from step b) is cooled in step c) to a temperature at least 40° C., preferably at least 50° C., preferably at least 60° C., and preferably at least 70° C. lower relative to the desired temperature of the cooled liquid fraction in the recirculation loop of the reaction section.

Step d) of Introducing the Fraction Resulting from c)

The process according to the invention therefore comprises a step d) of introducing, into the oligomerization step a), the solvent fraction cooled in step c) to a temperature below the temperature of the recirculation loop.

Advantageously, the introduction of the cooled solvent fraction is carried out in the reaction section, preferably in the reactor and/or in one or more of the recirculation loops. Preferably, the introduction is carried out in a recirculation loop upstream or downstream of the thermal exchanger of said recirculation loop, i.e. upstream or downstream of step a4), preferably the introduction is carried out downstream of the thermal exchanger.

The introduction of the cooled solvent fraction according to the invention makes it possible to partly control the exothermicity of the oligomerization step and thus to limit the size of the heat exchanger(s) used in at least one recirculation loop.

Advantageously, the introduction of the cooled solvent fraction downstream of the thermal exchanger of the recirculation loop makes it possible to minimize the temperature difference between the cooled solvent fraction and the liquid fraction of the recirculation loop. This also makes it possible to maximise the use of the exchanger of the recirculation loop(s) and therefore to minimize its size.

Advantageously, the mixture of the solvent fraction cooled in step c) with the liquid fraction circulating in the recirculation loop of the reaction section makes it possible to decrease the temperature of the liquid fraction of the recirculation loop by 0.1° C. to 20.0° C., preferably between 0.2° C. and 15.0° C. and preferably between 0.5° C. and 10.0° C.

Advantageously, the cooled solvent fraction has a flow rate, as a weight percentage relative to the flow rate of the liquid circulating in the circulation loop, of between 0.05% and 15.0%, preferably between 0.1% and 10.0%, preferably between 0.5% and 8.0%, preferably between 0.8% and 6.0% and preferably between 1.0% and 5.0%.

Thus, the implementation of steps c) and d) according to the invention makes it possible, by means of the cooled solvent fraction, to reduce the energy exchanged in the recirculation loops, and therefore the size of the exchanger. The expected saving may advantageously be of the order of 1% to 50%, preferably between 2% and 30% and preferentially between 3% and 20% over the exchange surface area.

BRIEF DESCRIPTION OF THE DRAWING

FIG. 1 represents a schematic illustration of a plant carrying out an embodiment of the oligomerization process according to the invention. Said plant comprises a two-phase liquid/gas oligomerization reactor A, a recirculation loop comprising an exchanger B and a pump C, a separation section D, a pump E for circulating the solvent fraction, and an exchanger for cooling the solvent fraction (F). In this plant, the stream 2 is a mixture of the stream 1 of fresh ethylene and of ethylene resulting from the separation section. The stream 2 is introduced into the reactor A. The stream 3 is the liquid phase fraction withdrawn from the reactor and sent to the recirculation loop comprising an exchanger B and a pump C in order to obtain a cooled liquid fraction 4. The stream 6 is the solvent fraction separated in the separation section D which passes through a pump E and is cooled in an exchanger F to give a cooled solvent fraction 7. The fractions 7 and 4 are mixed to give a stream 8 before being introduced into the reactor A. The stream 5 corresponding to a portion of the effluent withdrawn from the reactor A is sent to the separation section D. The separation section makes it possible to obtain the stream 6, a stream 9 corresponding to the light reaction products, a stream 10 corresponding to the heavy reaction products and a stream 11 corresponding to a heavy fraction comprising the spent catalyst.

EXAMPLES

The examples below illustrate the invention without limiting the scope thereof.

The examples below describe a process for the oligomerization of ethylene carried out continuously in a two-phase gas/liquid reactor of bubble column type at a pressure of 6.1 MPa and a temperature of 135° C. The catalytic system is introduced into the reactor at a concentration of 1 ppm by weight of chromium, comprises the chromium precursor $Cr(2\text{-ethylhexanoate})_3$, 2,5-dimethylpyrrole at a molar ratio relative to the chromium of 3, 11 molar equivalents of triethylaluminum and 8 molar equivalents of diethylaluminum chloride relative to the chromium, in the presence of o-xylene as additive at a molar ratio of 500 relative to the chromium, and cyclohexane as solvent.

The amount of cyclohexane, used as solvent 6, introduced into the reactor A is dependent on the amount of ethylene entering the same reactor A (stream 2), and the amount of solvent is adjusted so as to have a solvent content of 58% in the reactor.

Example 1 (Comparative)

Example 1 illustrates a reference embodiment according to the prior art corresponding to FIG. 1, with the exception that the solvent fraction (7) recycled from the separation section to the reaction section is not cooled by a heat exchanger F and in which the oligomerization process uses a gas-liquid reactor of bubble column type.

The catalytic system is brought into contact with gaseous ethylene by introduction of said gaseous ethylene into the lower part of said reactor. The effluent is subsequently recovered at the bottom of the reactor.

The production of the recovered product requires the conversion of 14 000 kg/h of reactant. The flow rate of solvent under the operating conditions adopted is 19 500 kg/h. The temperature of the recycled solvent fraction is 101° C.

The residence time in the reaction section (reactors+recirculation loop(s)) is 40 minutes.

Since the oligomerization reaction is exothermic, the heat of the reaction is removed by heat exchangers placed on loops for recirculation to the reactor, having a total surface area of 1650 m$^2$. The total reaction liquid volume of 41.3 m$^3$ is distributed between the volume taken by the heat exchangers and their recirculation loop, and the reactor. The total reaction liquid volume is broken down in the following manner: 30.1 m$^3$ for the heat exchange loops, and 11.2 m$^3$ for the reactor. The height of liquid in the bubble column is then 5.0 m for a diameter of 1.7 m. The temperature of the mixture 8 of the solvent 7 and of the recirculation fluid 4 is then 120° C. The temperature of the stream 4, corresponding to the outlet of the exchanger B, is then 120.4° C.

The production of hex-1-ene is 9.32 tonnes/hour, the hex-1-ene selectivity is 93.2 wt %.

Example 2 (According to the Invention)

The oligomerization process according to the invention is performed under the same conditions as in example 1. Example 2 further comprises a step of cooling the solvent fraction from the separation section to the reaction section via an exchanger F as depicted in FIG. 1. Said solvent fraction is cooled to a temperature of 40° C.

The step of cooling the solvent fraction makes it possible to reduce the need for exchange in the recirculation loops, which results in a decrease of the surface area of the exchangers. The total surface area of the exchangers of the recirculation loops is then limited to 1440 m$^2$. In this example, the residence time is kept identical to example 1, namely 40 minutes. The reaction liquid volume which is dependent on the production and on the residence time of the catalyst in the reaction section is then identical to that of example 1. Owing to the decrease of the surface area required in the exchangers, the volume of the recirculation loops is reduced by 3% (volume of 29.2 m$^3$). The liquid volume of the reactor may then be increased by 8% (working volume of 12.1 m$^3$), which leads to a gain in the height of liquid of 8% (liquid height of 5.4 m in this example). Since the diameter is independent of the volume of the recirculation loop, it is therefore identical to example 1, namely 1.7 m.

The temperature target of the mixture 8 of the solvent fraction 7 and of the liquid fraction 4 circulating in the recirculation loops was kept identical to example 1, namely 120° C. The temperature of the cooled liquid fraction 4, corresponding to the outlet of the exchanger B, is then 121.9° C.

Thus, the process according to the invention makes it possible to reduce the exchange surface area of the heat exchangers by 13% compared to the exchange surface area of example 1, which represents a saving in the operating cost of the unit. Furthermore, the decrease of 3% in the volume of the recirculation loops also makes it possible to increase the liquid volume of the reactor by 8%, which makes it possible to maximize the ethylene saturation in the liquid contained in the reactor.

The production of hex-1-ene is 9.32 tonnes/hour, the hex-1-ene selectivity is 93.2 wt %.

Example 3 (According to the Invention)

The oligomerization process according to the invention is performed under the same conditions as in example 2.

The step of cooling the solvent fraction makes it possible to reduce the need for exchange in the recirculation loops, which results in a decrease of the surface area of the exchangers. The solvent fraction is cooled to a temperature of 40° C. The total surface area of the exchangers of the exchange loop is then limited to 1440 m$^2$, namely a decrease of 13% compared to example 1. The dimensions of the reactor are kept identical to example 1. Owing to the decrease of the surface area required in the exchangers, the volume of the recirculation loops is reduced by 3% (volume of 29.2 m$^3$). The liquid volume of the reactor is 11.2 m$^3$. The reaction liquid volume of the reaction section is therefore then 40.4 m$^3$, namely a 2% saving compared to example 1.

The temperature target of the mixture 8 of the solvent 7 and of the recirculation fluid 4 was kept identical to example 1, namely 120° C. The temperature of the stream 4, corresponding to the outlet of the exchanger B, is then 121.9° C.

The residence time of the catalyst in the reaction section is then 39 minutes.

The production of hex-1-ene is 9.32 tonnes/hour, the hex-1-ene selectivity is 93.3 wt %.

The saving in the residence time enables an increase in selectivity of 0.1%. This increase enables, for a constant hex-1-ene production, a decrease in the ethylene consumption of 0.1% and therefore a saving in the operating cost of the unit.

The saving in the residence time enables a saving in the chromium concentration needed for achieving this performance of 2% (corresponding to 0.98 ppm of chromium), namely a saving in the catalyst consumption and therefore a saving in the operating cost of the unit.

The table below summarizes the results obtained for examples 1 to 3.

TABLE 1

| | | Example 1 | Example 2 | Example 3 |
|---|---|---|---|---|
| Temperature of the solvent fraction | ° C. | 101 | 40 | 40 |
| Temperature of the cooled liquid fraction | ° C. | 120.4 | 121.9 | 121.9 |
| Temperature of solvent fraction + cooled liquid fraction | ° C. | 120 | 120 | 120 |
| Exchange surface area of the recirculation loops | m$^2$ | 1650 | 1440 | 1440 |
| Volume of the recirculation loops | m$^3$ | 30.1 | 29.2 | 29.2 |
| Liquid volume of the reactor | m$^3$ | 11.2 | 12.1 | 11.2 |
| Reaction section volume | m$^3$ | 41.3 | 41.3 | 40.4 |
| Reactor diameter | m | 1.7 | 1.7 | 1.7 |
| Liquid height in the reactor | m | 5.0 | 5.4 | 5.0 |

TABLE 1-continued

| | | Example 1 | Example 2 | Example 3 |
|---|---|---|---|---|
| Residence time | min | 40 | 40 | 39 |
| Selectivity | % | 93.2 | 93.2 | 93.3 |

The invention claimed is:

1. A process for the oligomerization of an olefinic feedstock, said process comprising:
   a) oligomerizing said olefinic feedstock in a reaction section at a temperature between 30° C. and 200° C., a pressure between 0.1 and 10 MPa, and in the presence of a homogeneous catalytic oligomerization system and a solvent, the reaction section comprising an oligomerization reactor and one or more recirculation loops enabling control of the temperature in said reactor via cooling of a liquid phase fraction, wherein said one or more recirculation loops is formed by withdrawing a liquid phase fraction from the oligomerization reactor, cooling at least a portion of the withdrawn liquid phase fraction, and introducing the cooled liquid phase fraction into the oligomerization reactor,
   b) separating, in a downstream separation section, a reaction effluent resulting from the oligomerization so as to obtain a solvent fraction,
   c) cooling the solvent fraction to a temperature below the temperature of the one or more recirculation loop(s), and
   d) introducing into the reaction section the cooled solvent fraction.

2. The process as claimed in claim 1, wherein the solvent fraction is cooled in c) to a temperature between 0° C. and 150° C.

3. The process as claimed in claim 1, wherein the solvent fraction is cooled in c) to a temperature at least 40° C. lower relative to the temperature of the cooled liquid phase fraction in the one or more recirculation loops.

4. The process as claimed in claim 1, wherein the cooling of the solvent fraction in c) is carried out by one or more thermal exchangers.

5. The process as claimed in claim 4, wherein the introducing of the cooled solvent fraction is carried out by introducing the cooled solvent fraction into a recirculation loop of said one or more recirculation loops, wherein the cooled solvent fraction is introduced upstream or downstream of a thermal exchanger of the recirculation loop.

6. The process as claimed in claim 4, wherein the introducing of the cooled solvent fraction is carried out by introducing the cooled solvent fraction into a recirculation loop of said one or more recirculation loops, wherein the cooled solvent fraction is introduced downstream of a thermal exchanger of the recirculation loop.

7. The process as claimed in claim 1, wherein the downstream separation section comprises at least two distillation columns.

8. The process as claimed in claim 1, wherein the introducing of the cooled solvent fraction into the reactor section is carried out by introducing the cooled solvent fraction into the reactor.

9. The process as claimed in claim 1, wherein the cooled solvent fraction has a flow rate, as a weight percentage relative to the flow rate of the liquid circulating in the one or more recirculation loop(s), of between 0.05% and 15.0%.

10. The process according to claim 1, wherein the olefinic feedstock comprises olefins having between 2 and 6 carbon atoms.

11. The process as claimed in claim 10, wherein the olefinic feedstock is chosen from butene, propylene and ethylene, alone or as a mixture.

12. The process as claimed in claim 1, wherein the cooling of at least a portion of the withdrawn liquid phase fraction is carried out by circulating said at least a portion of the liquid phase fraction through one or more thermal exchangers located in the one or more recirculation loops.

13. The process as claimed in claim 12, wherein the thermal exchanger(s) used in the one or more recirculation loops reduce(s) the temperature of said at least a portion of the liquid phase fraction by 1.0° C. to 30.0° C.

14. The process as claimed in claim 12, wherein the thermal exchanger(s) used in in the one or more recirculation loops reduce(s) the temperature of said at least a portion of the liquid phase fraction by 2.0° C. to 25.0° C.

15. The process as claimed in claim 1, wherein the reaction effluent is obtained by dividing the withdrawn liquid phase fraction from the oligomerization reactor into two streams.

16. The process as claimed in claim 1, wherein the oligomerization reactor is a a two-phase gas/liquid reactor or a single-phase liquid reactor.

17. The process as claimed in claim 1, wherein the cooling of the solvent fraction is carried out by one or more heat exchangers selected from process fluid/process fluid heat exchangers, air cooler heat exchangers, and cooling water heat exchangers.

18. The process as claimed in claim 1, wherein the downstream separation section comprises at least three distillation columns.

19. The process as claimed in claim 1, wherein the cooled solvent fraction has a flow rate, as a weight percentage relative to the flow rate of the liquid circulating in the one or more recirculation loop(s), of between 0.1% and 10.0%.

20. The process according to claim 1, wherein the olefinic feedstock comprises olefins having between 2 and 4 carbon atoms.

21. The process as claimed in claim 1, wherein the introducing of the cooled solvent fraction into the reactor section is carried out by introducing the cooled solvent fraction into the one or more of the recirculation loops.

22. The process as claimed in claim 1, wherein the oligomerization reactor is a two-phase gas/liquid reactor.

23. The process as claimed in claim 1, wherein the flow rate of the reaction effluent is from 5 to 200 times lower than the liquid flow rate sent to the cooling said at least a portion of the withdrawn liquid phase fraction.

* * * * *